US012773705B2

(12) United States Patent
Ji

(10) Patent No.: US 12,773,705 B2
(45) Date of Patent: Oct. 27, 2026

(54) ONE-TOUCH MAKEUP REMOVER PUMP HEAD

(71) Applicant: ZHEJIANG UKPACK PACKAGING CO., LTD., Yuyao City (CN)

(72) Inventor: Shunjin Ji, Yuyao City (CN)

(73) Assignee: ZHEJIANG UKPACK PACKAGING CO., LTD, Yuyao City (CN)

( * ) Notice: Subject to any disclaimer, the term of this patent is extended or adjusted under 35 U.S.C. 154(b) by 249 days.

(21) Appl. No.: 18/201,311

(22) Filed: May 24, 2023

(65) Prior Publication Data

US 2024/0058829 A1 Feb. 22, 2024

(30) Foreign Application Priority Data

Aug. 18, 2022 (CN) ......................... 202210995631.6

(51) Int. Cl.

*B05B 11/10* (2023.01)
*A45D 40/22* (2006.01)
*B65B 43/22* (2006.01)
*B65B 51/18* (2006.01)

(52) U.S. Cl.

CPC .......... *B05B 11/1001* (2023.01); *A45D 40/22* (2013.01); *B05B 11/1059* (2023.01); *B65B 43/22* (2013.01); *B65B 51/18* (2013.01)

(58) Field of Classification Search

CPC .............. A45D 2200/056; A45D 40/22; A45D 40/222; B05B 11/0032; B05B 11/1001; B05B 11/00; B05B 11/1047; B05B 11/1023; B65D 43/22; B65D 51/18; B65D 83/20

USPC ...................... 222/402.13, 405, 383.1, 402.1

See application file for complete search history.

(56) References Cited

U.S. PATENT DOCUMENTS

| | | | | |
|---|---|---|---|---|
| 3,463,093 A * | 8/1969 | Pilz | B05B 11/1026 | 417/547 |
| 4,830,284 A * | 5/1989 | Maerte | B05B 11/1023 | 239/487 |
| 5,154,328 A * | 10/1992 | Gueret | B05B 11/1001 | 222/491 |
| 7,611,024 B2 * | 11/2009 | Yamanaka | B65D 47/0814 | 215/237 |
| 7,775,404 B2 * | 8/2010 | Pardonge | B05B 11/1018 | 222/321.6 |
| 8,141,731 B2 * | 3/2012 | Mazurkiewicz | B65D 47/0814 | 220/283 |
| 11,396,408 B2 * | 7/2022 | Jinkins | B65D 51/18 | |
| 2013/0230423 A1 * | 9/2013 | Faneca Llesera | B05B 11/1074 | 92/248 |

(Continued)

*Primary Examiner* — David P Angwin
(74) *Attorney, Agent, or Firm* — Oliff PLC

(57) ABSTRACT

A pump head includes a bottle cap, a pump assembly, a pressing plate cap, and a flip cover hingedly fixed to the bottle cap. Snap-in edges protrude from a top of the bottle cap and engage with a rim edge of the flip cover. A button slides in a button slot on one side of the cap between the snap-in edges. An elastic strip is disposed between the flip cover and the bottle cap at the hinged joint, and both ends of the elastic strip are molded in one piece with the bottle cap and the flip cover of the bottle cap respectively. An elastic contact of the button pushes against the elastic strip of the bottle cap, causing the flip cover to pop open. Pressing down on the pressing plate cap causes the pump assembly to dispense liquid through an orifice formed in the pressing plate cap.

12 Claims, 4 Drawing Sheets

(56) References Cited

U.S. PATENT DOCUMENTS

| | | | | |
|---|---|---|---|---|
| 2017/0280852 | A1* | 10/2017 | Kang | B05B 1/14 |
| 2018/0200653 | A1* | 7/2018 | Park | B01D 35/153 |

* cited by examiner

ONE-TOUCH MAKEUP REMOVER PUMP HEAD

TECHNICAL FIELD

The present invention relates to the makeup remover pump head, or specifically, one-touch make-up remover pump head.

BACKGROUND ART

The make-up remover pump is one of the lotion pumps, generally comprising the pump head and the bottle, and is one of the containers for liquid cream cosmetic products. Pushing down the nozzle of the lotion pump, the liquid cream lotion will flow out of the container. How it works: pushing down the nozzle, the cap will move and cause the volume in the bottle to expand and shrink in cycles, and the liquid pressure will increase and thus draw out the liquid in bottle. Some make-up remover pumps available on the market come with anteriorly protruded disc structure on top, pressing down the disc, then liquid will flow out of the liquid outlet that is disposed in the middle of the disc, e.g.: the patent as disclosed in Chinese patent literature under the Patent Application Number: 201720902071.X, Date of Publication: 8 May 2018, Title of Utility Model Patent "A pump head mechanism and push-down makeup remover container"; another patent as disclosed in Chinese patent literature under the Patent Application Number: 201821078467.8, Date of Publication: 26 Mar. 2019, Title of Utility Model Patent "A makeup remover pump structure"; another patent as disclosed in Chinese patent literature under the Patent Application Number: 202120484978.5, Date of Publication: 24 Dec. 2021, Title of Utility Model Patent "A pump head for makeup remover push-down dispenser". However, the flip cover and the bottle cap as parts of the above-mentioned products and similar products are molded in one-piece, but the side of the bottle cap is not designed with the button structure. As a consequence, the prior-use safety of similar products is poor, liquid is likely to dispense out due to vibration or other means by chance.

SUMMARY OF INVENTION

To overcome the deficiencies as stated above, the present invention is intended to provide a one-button makeup remover pump, to the extent that the absence of button on the bottle cap structure disposed with a flip cover in existing similar products, and certain technical issues including single form of button structure, inconvenient use and assembly, unavailable recycling and reuse, and poor eco-friendly property would be resolved. These aims can be realized by the following technical alternatives.

In a one-touch makeup remover pump head, an inner threaded ring is provided at the bottom of the bottle cap, a pump outlet ring is disposed on the inner side of the inner threaded ring of the bottle pump, a clasp of a pump body is fixed to the pump outlet ring of the pump body, a stem extending from the pump body is snap-fit to a stem sleeve disposed at the bottom of a pressing plate cap, an anti-release plug is disposed on the orifice at the top of the pressing plate cap, and liquid flows out through the orifice at the anti-release plug disposed on top of the pressing plate cap. A pump core assembly comprises the pump body, the stem, a plastic ball bead, an inner plug, a piston, a valve pin and a spring. As the essential point of the structural design, the top sides of the bottle cap are symmetrically provided with protruded snap-in edges, a button slot on one side of the cap between the snap-in edges is provided with a button, and snap-in edges of the cap are snapped to the corresponding rim edge of a flip cover. On the other symmetrical side of the button, the flip cover is hingedly fixed to the bottle cap, an elastic strip is disposed between the flip cover and the bottle cap at a hinged joint, and both ends of the elastic strip are molded in one piece with the bottle cap and the flip cover of the bottle cap respectively. An elastic hole of the button passes through the outer diameter of the inner threaded ring at the bottom of the bottle cap, with one end of the button fit into the button slot on one side of the bottle cap, and an elastic contact of the other end extended from the button slot and symmetrical with respect to the opening slot of the bottle cap, where the elastic contact of the button is aligned with the elastic strip. The elastic hole of the button is larger than the outer diameter of the inner threaded ring of the bottle cap, the elastic contact of the button is set against the elastic strip of the bottle cap, and the flip cover of the bottle cap pops open. When pushing down, the button would be subject to deformation or displacement, such that the elastic contact of the button has one end set against the elastic strip disposed between the flip cover and the bottle cap, the snap-in position between the flip cover and the bottle cap is forced to displace or disengage, and the flip cover can pop open from the bottle cap.

Disconnected strap ribs are disposed on both sides of the opening slot where the flip cover of the bottle cap is hinged and fixed. The flip cover is symmetrical to the opening slot is provided with an opening side slot. Both ends of the elastic strip of the bottle cap are molded in one piece with the bottle cap and the flip cover of the bottle cap through the bottom of the opening slot and the bottom of the side slot respectively, and the strap ribs are molded in one piece with the bottle cap. The structural form of one-piece molded flip cover and bottle cap is described above, an alternative is other existing pin-type hinges, but the elastic strip molded in one piece with the flip cover and the bottle cap is considered simple and believed to be the best solution.

The button is provided with equally spaced protruded ribs inside the elastic hole of the button, a protruded locating rib is disposed in the middle on top of the elastic contact of the button, the upper and lower edges of the curved side of the button symmetrically on the other side of the elastic contact are protruded above the elastic hole of the button respectively, and the locating rib at the elastic contact of the button is inserted into a locating slot formed in the bottle cap. The above structure permits the stable use of the elastic contact of the button at one end and ensures a larger push-down area on the other side.

A clasp hole is disposed on top of the button, the opening inside the flip cover of the bottle cap to which the clasp hole corresponds is provided with a snap-in clasp, and the snap-in clasp of the flip cover engages with the clasp hole of the button. The above structure enhances the snap-in securing between the flip cover and the button.

A protruded snap-in lip is disposed on top of the button, the snap-in lip protrudes upward and toward and outer periphery of the button and is molded in one piece. An opening inside the flip cover of the bottle cap to which the protruded snap-in lip corresponds is provided with a protruded snap-in rib, and the snap-in rib of the flip cover engages with the snap-in lip of the button. The above structure also allows for the snap-in securing between the flip cover and the button.

The snap-in lip of the button is provided with the clasp hole, a lower clasp is disposed on the edge of the snap-in lip above the clasp hole, the opening inside the flip cover of the bottle cap to which the lower clasp corresponds is provided with an upper clasp, and the upper clasp of the flip cover engages with the clasp hole of the button. Another alternative of snap-in securing structure between the flip cover and the button is described above.

A locking knob is disposed at the button slot side of the bottle cap, and slide hooks on the upper and lower edges of the locking knob are fastened to a slide slot on the button slot side of the bottle cap, and a locking head on the locking knob side is inserted into a locking hole on the button side of the bottle cap.

The spring in the pump body is a metal spring, the outer diameter of a plug gap on top of the inner plug is fastened to the inner diameter of a pump outlet of the pump body, the metal spring is disposed on the inner side of the inner plug with one end set against the bottom of a spring cavity in the inner plug, and the other end set against a spring rib of the outer diameter of the stem. The stem has one end extended from the inner plug and the pump body and the other end fastened in one-piece to the valve pin in the pump body, the piston is disposed at a snap-in joint, the stem and the pin at the snap-in joint are disposed with accessible liquid pathways respectively, the outer diameter of the piston seals against the inner wall of the pump body, the plastic ball bead is fastened to the inlet hole of the pump body underneath the valve pin, and a dip tube is inserted at the bottom of the inner hole of the pump body. The particular structural embodiment of the pump core assembly is described above.

The metal spring is replaced by a spiral one-piece plastic spring. The above structure facilitates the overall recycling and reuse of the makeup remover pump head.

The present invention features a reasonable structure, convenient assembly and use and in particular, various forms of snap-in structures between the flip cover and the bottle cap. The use in conjunction with the plastic spring structure in the pump body facilitates its overall recycling and reuse; it can be suitably used as one-touch makeup remover pump head, or the structural modification of similar products.

Serial numbers and names of the accompanying drawings: 1. Cap, 101. Snap-in edge, 102. Elastic strip, 103. Snap-in clasp, 104. Snap-in rib, 104'. Snap-in rib, 105. Locating slot, 110. Inner threaded ring, 112. Pump outlet ring, 114. Stem sleeve, 1142. Orifice, 116. Gasket, 2. Pressing plate cap, 3. Anti-release plug, 4. Button, 401. Elastic hole, 402. Elastic contact, 403. Clasp hole, 404. Snap-in lip, 406. Press portion, 407. Protruded ribs, 408. Locating rib, 5. Flip cover, 52. Hinged joint, 522. Strap ribs, 6. Plastic ball bead, 7. Pump body, 8. Dip tube, 9. Stem, 10. Inner plug, 11. Piston, 12. Valve pin, 13. Metal spring, 14. Locking knob, 142. Slide hooks, 15. Plastic spring, 16. Button slot

EMBODIMENTS

Figure 1:
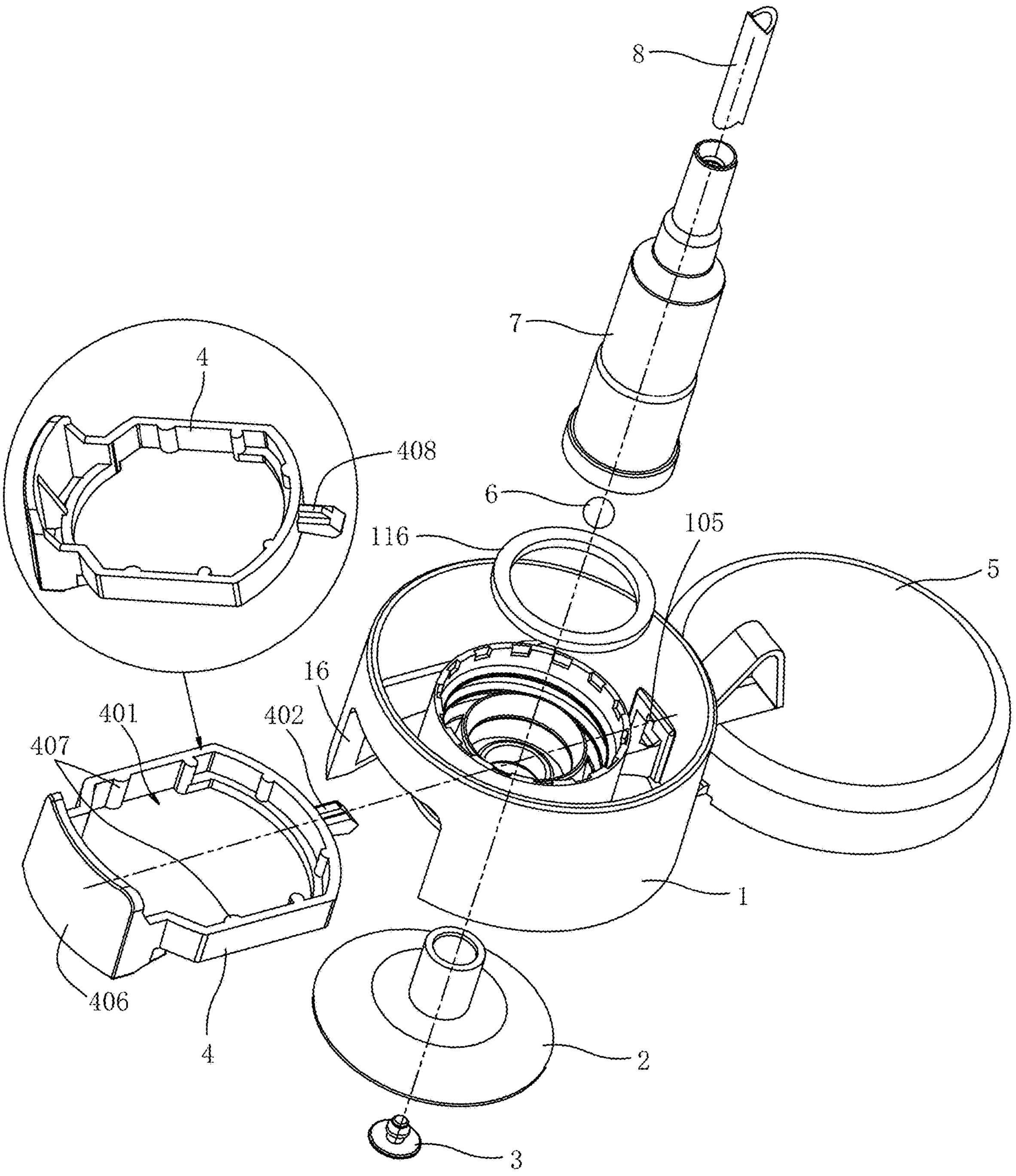
FIG. 1 is the schematic diagram of the exploded structure of the first embodiment of the present invention, in which the framed part is the schematic diagram of the bottom structure of the button.
Figure 2:
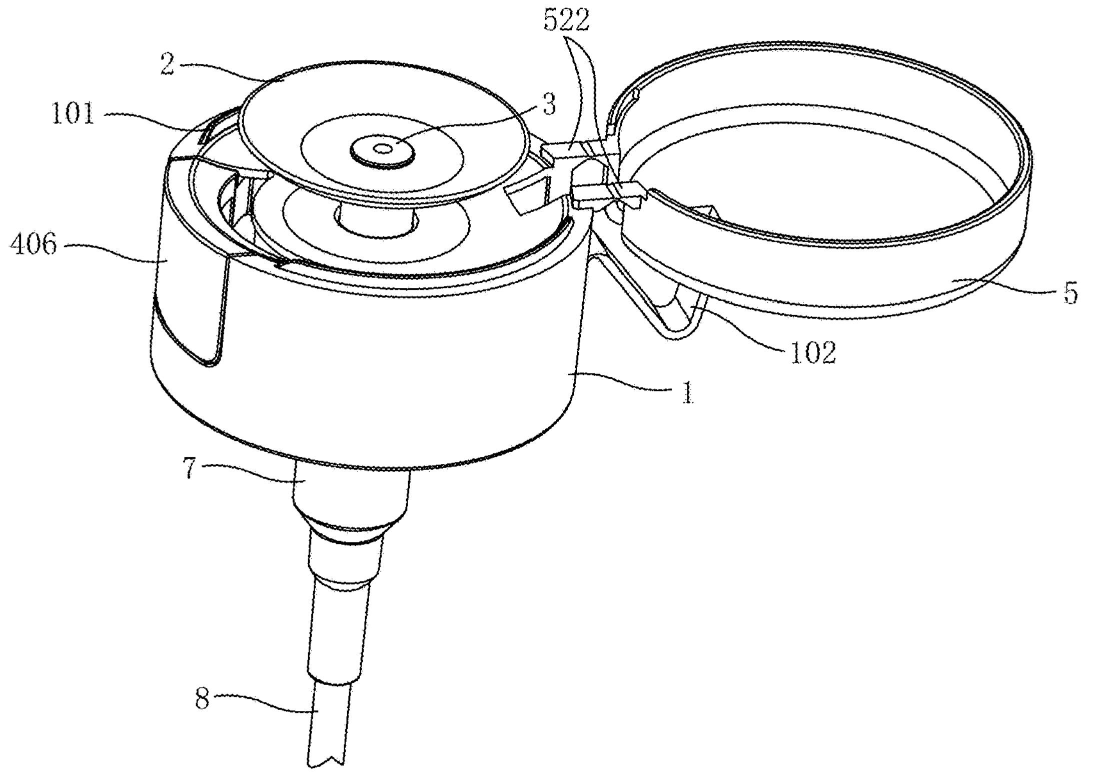
FIG. 2 is the schematic diagram of the use state of FIG. 1.
Figure 3:
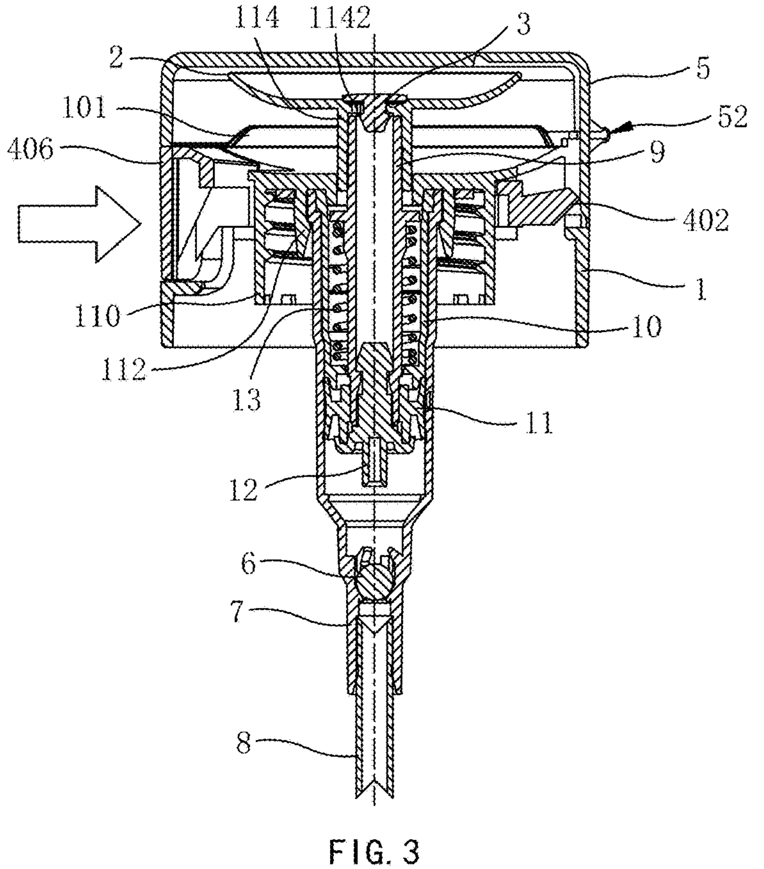
FIG. 3 is the schematic cross-section diagram of the closed state of FIG. 2, with the arrow showing the direction of pushing down the button.

The structure of the invention is further described with reference to the accompanying drawings. As shown in the first embodiment of FIGS. 1-3, an inner threaded ring 110 is provided at the bottom of the bottle cap 1, a pump outlet ring 112 is disposed on the inner side of the inner threaded ring of the bottle pump, a clasp of a pump body 7 is fixed to the pump outlet ring 112 of the pump body, a stem 9 extending from the pump body 7 is snap-fit to a stem sleeve 114 disposed at the bottom of a pressing plate cap 2, an anti-release plug 3 is disposed on the orifice 1142 at the top of the pressing plate cap 2, and liquid flows out through the orifice 1142 at the anti-release plug 3 disposed on top of the pressing plate cap 2. A pump core assembly comprises the pump body 7, the stem 9, a plastic ball bead 6, an inner plug 10, a piston 11, a valve pin 12 and a spring 13. The specific structure is described as follows: the top sides of the bottle cap 1 are symmetrically provided with protruded snap-in edges 101, a button slot 16 on one side of the cap between the snap-in edges 101 is provided with a button 4, and snap-in edges 101 of the cap are snapped to the corresponding rim edge of a flip cover 5. On the other symmetrical side of the button 4, the flip cover 5 is hingedly fixed to the bottle cap 1, an elastic strip 102 is disposed between the flip cover 5 and the bottle cap 1 at a hinged joint 52, and both ends of the elastic strip 102 are molded in one piece with the bottle cap 1 and the flip cover 5 of the bottle cap respectively.

An elastic hole 401 of the button passes through the outer diameter of the inner threaded ring 110 at the bottom of the bottle cap 1, with one end of the button 4 fit into the button slot 16 on one side of the bottle cap 1, and an elastic contact 402 of the other end extended from the button slot 16 and symmetrical with respect to the opening slot of the bottle cap 1, where the elastic contact 402 of the button is aligned with the elastic strip 102. The elastic hole 401 of the button is larger than the outer diameter of the inner threaded ring 110 of the bottle cap 1, the elastic contact 402 of the button is set against the elastic strip 102 of the bottle cap, and the flip cover 5 of the bottle cap 1 pops open.

Disconnected strap ribs 522 are disposed on both sides of the opening slot where the flip cover 5 of the bottle cap 1 is hinged and fixed. The flip cover 5 is symmetrical to the opening slot and is provided with an opening side slot. Both ends of the elastic strip 102 of the bottle cap 1 are molded in one piece with the bottle cap 1 and the flip cover 5 of the bottle cap through the bottom of the opening slot and the bottom of the side slot respectively, and the strap ribs 522 are molded in one piece with the bottle cap 1. The button 4 is provided with equally spaced protruded ribs 407 inside the elastic hole 401 of the button, a protruded locating rib 408 is disposed in the middle on top of the elastic contact 402 of the button, the upper and lower edges of the curved side of the button symmetrically on the other side of the elastic contact 402 are protruded above the elastic hole of the button respectively, and the locating rib 408 at the elastic contact 402 of the button is inserted into a locating slot 105 formed in the bottle cap 1. The outer diameter of a plug gap on top of the inner plug 10 is fastened to the inner diameter of a pump outlet of the pump body 7, a metal spring 13 is disposed on the inner side of the inner plug 10 with one end set against the bottom of a spring cavity in the inner plug 10, and the other end set against a spring rib of the outer diameter of the stem 9. The stem 9 has one end extended from the inner plug 10 and the pump body 7 and the other end fastened in one-piece to the valve pin 12 in the pump body 7, the piston 11 is disposed at a snap-in joint, the stem 9 and the pin 12 at the snap-in joint are disposed with accessible liquid pathways respectively, the outer diameter of the piston 11 seals against the inner wall of the pump body 7, the plastic ball bead 6 is fastened to the inlet hole of the pump body underneath the valve pin 12, and a dip tube 8 is inserted at the bottom of the inner hole of the pump body 7.

When pushing down, the button 4 would be subject to deformation or displacement, such that the elastic contact 402 of the button has one end set against the elastic strip 102 disposed between the flip cover 5 and the bottle cap 1, the snap-in position between the flip cover 5 and the bottle cap 1 is forced to displace or disengage, and the flip cover 5 can pop open from the bottle cap 1. At this point, upon pushing down the pressing plate cap 2, liquid will flow out of the pressing plate cap 2 for use.

Figure 4:
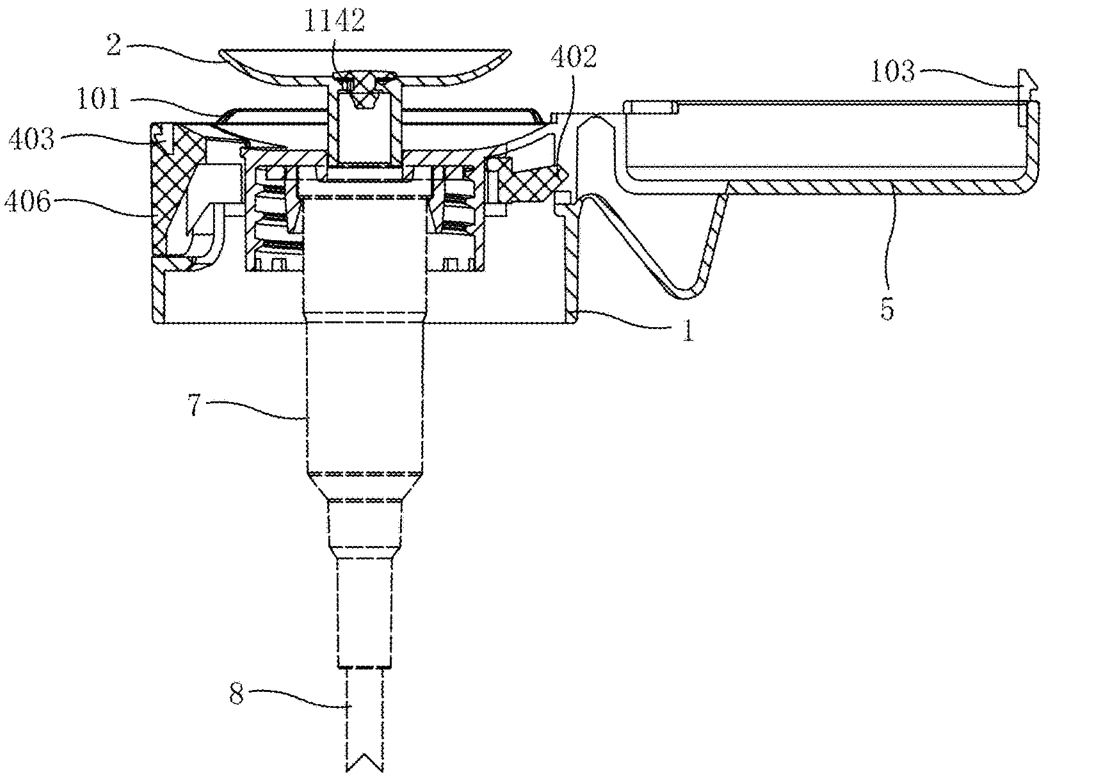
FIG. 4 is the schematic cross-section diagram of the open state of the second embodiment of the present invention, with the dashed line showing the pump core assembly.
Figure 5:
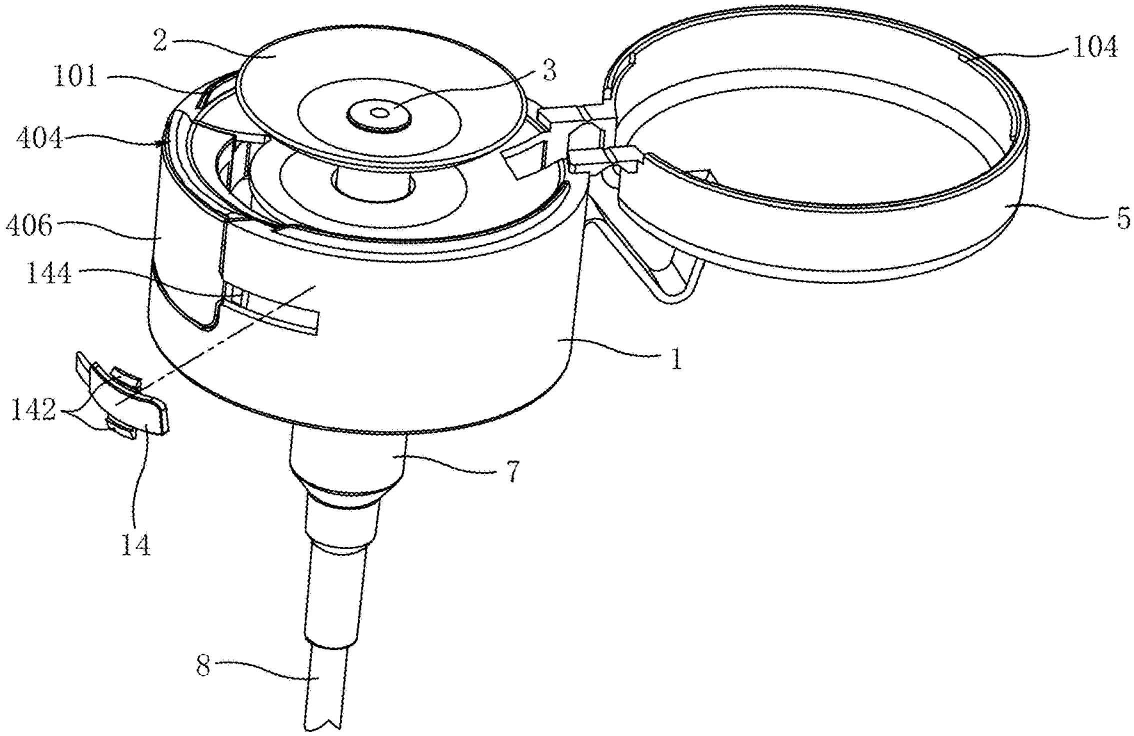
FIG. 5 is the schematic three-dimensional diagram of the lock button opening in the open state of the third embodiment of the present invention.

Referring to the structural features of the first embodiment as described above, the makeup remover pump head may also be structurally modified as follows: as shown in the second embodiment of FIG. 4, a clasp hole 403 is disposed on top of the button, the opening inside the flip cover 5 of the bottle cap 1 to which the clasp hole corresponds is provided with a snap-in clasp 103, and the snap-in clasp 103 of the flip cover 5 engages with the clasp hole 403 of the button. As shown in the third embodiment of FIG. 5, a protruded snap-in lip 404 is disposed on top of the button, and the snap-in lip 404 protrudes upward and toward and outer periphery of the button and id molded in one piece. An opening inside the flip cover 5 of the bottle cap 1 to which the protruded snap-in lip 404 corresponds is provided with a protruded snap-in rib 104, and the snap-in rib 104 of the flip cover 5 engages with the snap-in lip 404 of the button.

A locking knob 14 is disposed at the button slot side of the bottle cap, and slide hooks 142 on the upper and lower edges of the locking knob 14 are fastened to a slide slot 144 on the button slot side of the bottle cap 1, and a locking head on the locking knob side is inserted into a locking hole on the button side of the bottle cap 1.

Figure 6:
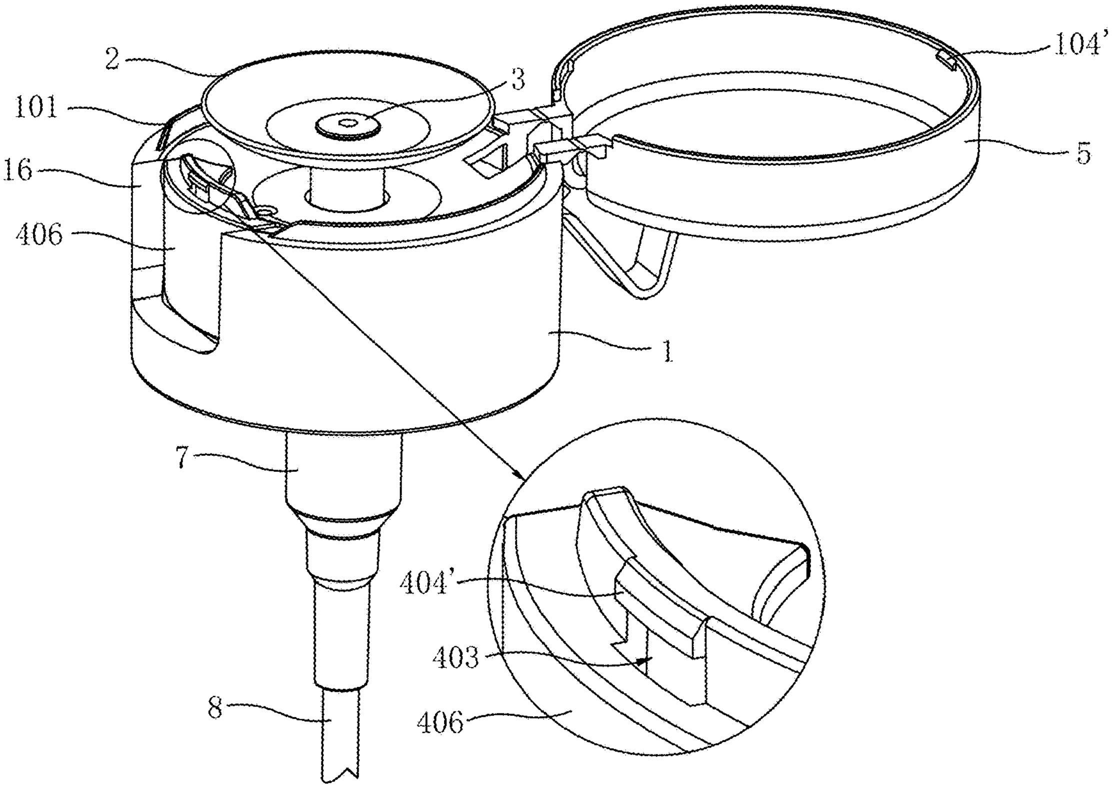
FIG. 6 is the schematic three-dimensional diagram of the open state of the fourth embodiment of the present invention, with the framed part of the diagram enlarged and the button push-down.
Figure 7:
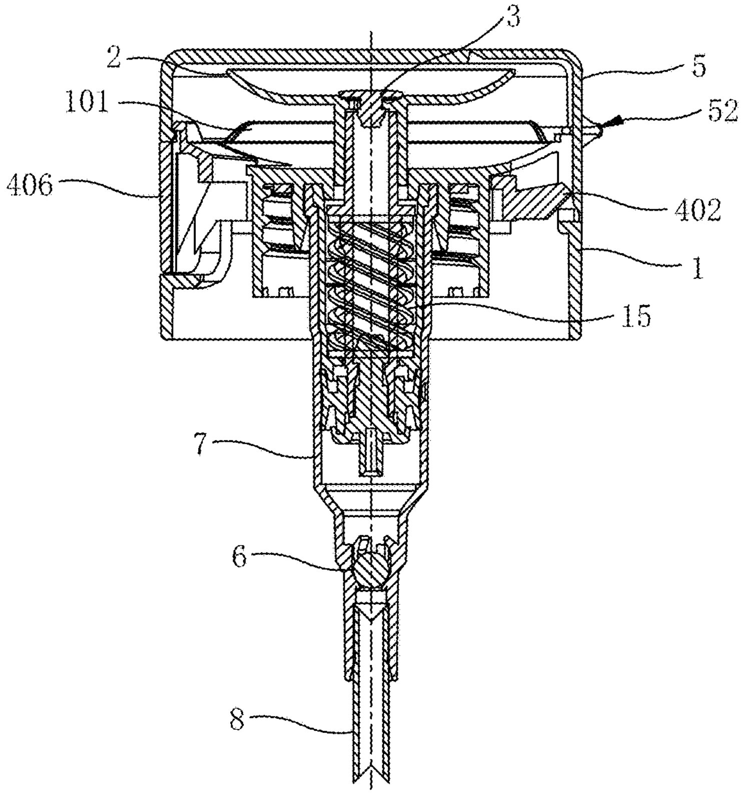
FIG. 7 is the schematic cross-section diagram of the closed state of FIG. 6, in which the metal spring is replaced by a plastic spring.

As shown in the fourth embodiment of FIGS. 6 and 7, the snap-in lip of the button is provided with the clasp hole 403, a lower clasp 404' is disposed on the edge of the snap-in lip above the clasp hole 403, the opening inside the flip cover 5 of the bottle cap 1 to which the lower clasp 404' corresponds is provided with an upper clasp 104', and the upper clasp 104' of the flip cover 5 engages with the clasp hole 403 of the button. The metal spring 13 is replaced by a spiral one-piece plastic spring 15. The push-down button as a part of the above structure can also drive the pop opening of the flip cover 5 from the bottle cover 1, the locking knob 14 prevents the accidental push-down of the button 5, and the above structure facilitates the overall recycling and reuse of the makeup remover pump head.

The invention claimed is:

1. A pump head, comprising:

a bottle cap, the bottle cap including:

an inner threaded ring provided at a bottom of the bottle cap, and a pump outlet ring disposed within the inner threaded ring, a pump assembly including:

a pump body fixed to the pump outlet ring, and a stem extending upward from the pump body, a pressing plate cap including a stem sleeve that is connected to the stem, an anti-release plug covering an upward-facing orifice at a top of the pressing plate cap, the anti-release plug and the orifice being configured to allow liquid to flow out through the orifice in response to downward movement of the stem, snap-in edges protruding from a top of the bottle cap, a flip cover including a bottom rim that engages the snap-in edges, the flip cover being connected to the bottle cap at a hinged joint, an elastic strip between the flip cover and the bottle cap at the hinged joint, the elastic strip being one piece with the bottle cap and the flip cover, a button slot on one side of the cap between the snap-in edges, a button including (i) a press portion that slides in the button slot, (ii) an elastic hole that surrounds the inner threaded ring, and (iii) an elastic contact that presses against the elastic strip when the press portion slides inward in the button slot, causing the flip cover to pop open, wherein the anti-release plug remains covering the orifice after the flip cover pops open, a slide slot in a peripheral wall of the bottle cap, the slide slot extending away from one side of the button slot, and a locking knob disposed at the slide slot, the locking knob configured to slide in the slide slot along a horizontal path that follows an outer perimeter of the peripheral wall of the bottle cap, the locking knob configured slide in and out of engagement with the button.

2. A pump head according to claim 1, wherein the hinged joint includes strap ribs disposed on both sides of the elastic strip, the strap ribs defining an opening through which the elastic strip moves during opening of the flip cover, and the strap ribs are one piece with the bottle cap.

3. A pump head according to claim 1, wherein the button is provided with protruded ribs inside the elastic hole of the button, a locating rib is disposed on the elastic contact of the button, and the locating rib of the elastic contact of the button is inserted into a locating slot formed in the bottle cap.

4. A pump head according to claim 1, wherein a clasp hole is disposed in a top surface of the button, and the flip cover of the bottle cap is provided with a snap-in clasp, and the snap-in clasp of the flip cover engages with the clasp hole of the button.

5. A pump head according to claim 1, wherein a protruded snap-in lip protrudes from a top surface of the button, upward and toward and outer periphery of the button, and a snap-in rib protrudes inward from an inner surface of the flip cover and engages with the snap-in lip of the button.

6. A pump head according to claim 5, wherein the snap-in lip of the button is provided with a clasp hole, and the snap-in rib of the flip cover engages with the clasp hole of the button.

7. A pump head according to claim 1, wherein the pump body assembly further includes:

a spring, a valve pin, an inner plug fastened to a pump outlet of the pump body, the spring being disposed inside the inner plug with one end of the spring against the inner plug, and another end of the spring against the stem, the stem having one end extended from the inner plug and the pump body and another end fastened to the valve pin, a piston inside the pump body, an outer diameter of the piston being sealed against an inner wall of the pump body, a plastic ball bead underneath the valve pin, and a dip tube connected to a bottom of the pump body.

8. A pump head according to claim 7, wherein the spring is a metal spring.

9. A pump head according to claim 7, wherein the spring is a spiral one-piece plastic spring.

10. A pump head according to claim 1, wherein the pressing plate cap is concave upwards.

11. A pump head according to claim 1, wherein the snap-in edges protrude upward from the top of the bottle cap, each snap-in edge having an arcuate shape that extends in parallel to an outer edge of the bottle cap, as seen in a plan view.

12. A pump head, comprising:

a bottle cap, the bottle cap including:

an inner threaded ring provided at a bottom of the bottle cap, and a pump outlet ring disposed within the inner threaded ring, a pump assembly including:

a pump body fixed to the pump outlet ring, and a stem extending upward from the pump body, a pressing plate cap including a stem sleeve that is connected to the stem, an anti-release plug covering an upward-facing orifice at a top of the pressing plate cap, the anti-release plug and the orifice being configured to allow liquid to flow out through the orifice in response to downward movement of the stem, snap-in edges protruding from a top of the bottle cap, the snap-in edges protruding upward from the top of the bottle cap, each snap-in edge having an arcuate shape that extends in parallel to a peripheral wall of the bottle cap, a flip cover including a bottom rim that engages the snap-in edges, the flip cover being connected to the bottle cap at a hinged joint, an elastic strip between the flip cover and the bottle cap at the hinged joint, the elastic strip being one piece with the bottle cap and the flip cover, a button slot on one side of the cap between the snap-in edges, a button including (i) a press portion that slides in the button slot, (ii) an elastic hole that surrounds the inner threaded ring, and (iii) an elastic contact that presses against the elastic strip when the press portion slides inward in the button slot, causing the flip cover to pop open, wherein the anti-release plug remains covering the orifice after the flip cover pops open.

* * * * *